UNITED STATES PATENT OFFICE.

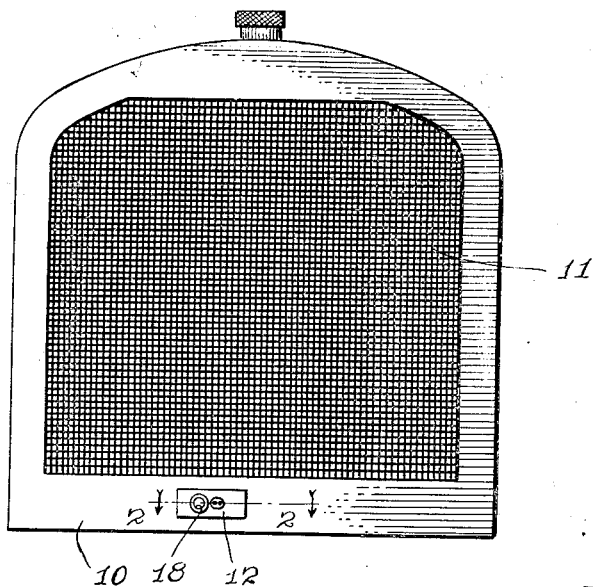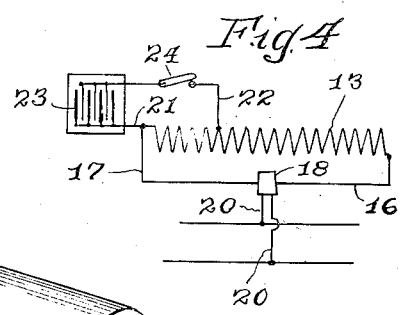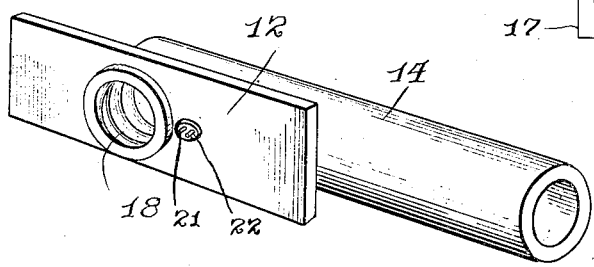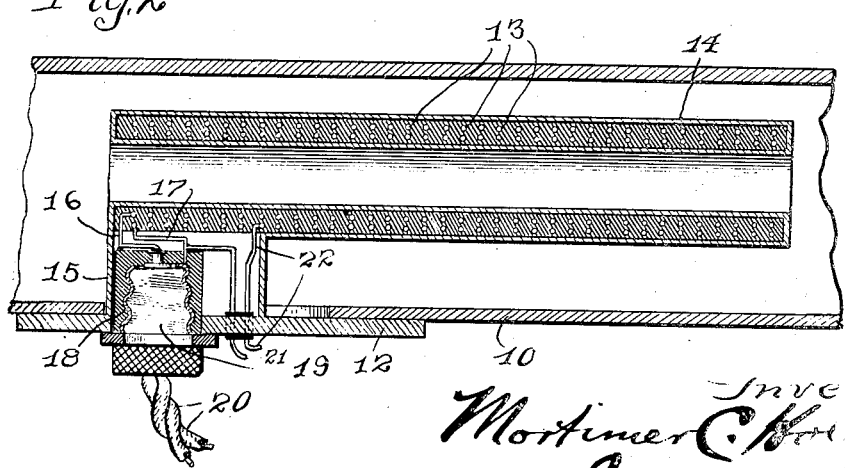

MORTIMER C. HOLLISTER, OF ELGIN, ILLINOIS.

AUTOMOBILE-RADIATOR.

1,298,505.  Specification of Letters Patent.  Patented Mar. 25, 1919.

Application filed June 19, 1917. Serial No. 175,577.

*To all whom it may concern:*

Be it known that I, MORTIMER C. HOLLISTER, a citizen of the United States, and a resident of Elgin, in the county of Kane, State of Illinois, have invented certain new and useful Improvements in Automobile-Radiators, of which the following is a specification, reference being had to the accompanying drawings.

My invention relates to automobile radiators and it has for its principal object the provision of a heating element incorporated within the radiator and preferably forming a permanent part of the radiator for protecting the radiator against freezing and making it easier to start the engine in cold weather without the necessity for heating the entire garage in which the automobile is kept. It is another object of my invention to provide an arrangement of heating means which may be used in the garage for keeping the radiator warm and which may be used in whole or in part for this purpose when the automobile is left standing for any considerable time outside of the garage. It is still another object of my invention to provide a heating element of this type which shall be rendered effective when in the garage by an electric current fed thereto from a commercial circuit and which may be rendered effective when outside of the garage by an electric current fed thereto from the storage battery system of the automobile. It is another object of my invention to improve devices or systems of this type in sundry details hereinafter pointed out. The preferred means by which I have accomplished my several objects are illustrated in the drawings and are hereinafter specifically described. That which I believe to be new and desire to cover by this application is set forth in the claims.

In the drawings:

Figure 1 is a rear view of an automobile radiator equipped with the preferred form of my improved heating means;

Fig. 2 is an enlarged detail, being an enlarged horizontal section taken on line 2—2 of Fig. 1;

Fig. 3 is an enlarged perspective view of the heating element shown in Fig. 2; and Fig. 4 is a diagrammatic view showing a system of electrical connections suitable for my improved heating means.

Referring to the several figures of the drawings in which corresponding parts are indicated by the same reference characters,—

10 indicates the bottom header of a radiator of an automobile which is in communication with a system or series of pipes or ducts 11 providing a comparatively large radiating surface exposed to the air as is usual in radiators of this type. A heating element is held in position within the header 10 by means of a face-plate 12 which is secured in any suitable manner to the rear wall of the header 10. The heating element comprises a coil 13 of resistance metal contained in the construction shown within a tubular casing 14 which is connected by a neck 15 with the face-plate 12. The casing, as clearly shown in Fig. 2, comprises two concentric walls that provide a space within which the heating element 13 is located, and as such space is closed at its ends the heating element is effectually closed off from contact with the water. Such construction provides, however, a central passage through the casing for the flow of water, and that fact taken in connection with the arrangement of the casing at a distance from the wall of the passage of the radiator in which it is located insures a quick heating of the water because of the fact that water flows not only through the central opening of the casing and against its heated inner wall but around and against its outer heated wall. The neck 15 performs the dual function, in the construction shown, of spacing the casing 14 at a distance from the wall of the water passage in the radiator header 10, and also providing a water-tight communication for the passage of the means employed to energize the heating element in the casing. As is clearly shown in Fig. 2, the ends of the coil 13 are connected by circuit wires 16—17 with a suitable socket 18 which is adapted to be connected by a screw plug 19 and cord 20 with any suitable source of electrical power such as the ordinary commercial lighting or power circuit. The socket 18 is inserted through and held by the face-plate 12 which projects into the hollow neck 15. As is also clearly shown in Fig. 2, a comparatively small portion of the coil 13 is adapted to be connected by means of wires 21—22 with another suitable source of electrical energy, such as the storage battery of the automobile. Such wires are located in the neck and arranged alongside of the socket. As shown in Fig. 2 the outer wall of the casing opposite the neck is cut away to expose the heating element and permit the leading therefrom or connection therewith of the two sets of current wires, but the connection of the neck to the casing effectually excludes any water through such opening, and as the ends of the space between the concentric walls of the casing are closed, of course, as shown, it will be evident that the coil or heating element has the water that flows through the radiator effectually excluded from it. As is shown diagrammatically in Fig. 4, the wires 21—22 are adapted to connect in series the storage battery 23 of the automobile and a switch 24 of any suitable type located in any convenient position.

As will be readily understood, when the automobile is in position in the garage, the electric current delivered to the coil 13 through the cord 20 as above described serves to heat the entire coil 13 so as to heat the water adjacent to the heating element in the header 10. The heated water is adapted to rise, as is fully understood, serving to maintain a circulation constantly through the radiator. Thus by the use of a fairly small amount of electric current the radiator is kept from freezing up and the automobile is kept warm enough to render the starting of the engine much more easily effected. Inasmuch as the operation of applying heat to the radiator comprises merely the screwing of the plug 19 into position in the socket 18, it is seen that by my invention I have provided a very convenient and effective expedient. Moreover, when the automobile is left standing for some time outside of the garage, by the mere closing of the switch 24 a small portion of the coil 13 is connected with the storage battery system serving to cause a heating of such small section of the coil. By this expedient the subsequent starting of the engine is facilitated and the radiator is kept from freezing for a considerably longer period than could be attained without the partial use of the heating coil 13.

What I claim as my invention and desire to secure by Letters Patent, is—

1. The combination with an automobile radiator, of a double-walled casing, located in a water passage of said radiator, a heating element contained between said double walls, said casing having an opening therethrough for the passage of water, and means for energizing the heating element.

2. The combination with an automobile radiator, of a double-walled casing located in a water passage of said radiator at a distance from the wall of such passage and having an opening therethrough for the passage of water, a heating element contained between said double walls, and means for energizing the heating element.

3. The combination with an automobile radiator, of a tubular casing open at both ends and arranged longitudinally of a water passage in the radiator, a heating element lying against the inner face of such tubular casing, means for protecting said heating element from contact with water passing through the casing, and means for energizing the heating element.

4. The combination with an automobile radiator, of a tubular casing arranged within a water chamber of the radiator, a concentric wall within the casing and at a distance therefrom, the space between the two walls being closed at its ends, a heating element supported between said two walls, and means for energizing such heating element, the central portion of the casing being open for the passage of water therethrough.

5. The combination with an automobile radiator, of a double-walled casing located in a water passage of said radiator and of materially less diameter than the passage, said casing having an opening therethrough from end to end to permit water to be in contact with both of the walls of the casing, a heating element supported between said double walls, the wall of the radiator and the outer wall of the said casing being each provided with an opening, means for closing said openings against the water in the radiator, and means connected with the heating element and passing through said openings for energizing said heating element.

6. The combination with an automobile radiator, of a double-walled casing located in a water passage of said radiator and of materially less diameter than the passage, said casing having an opening therethrough from end to end to permit water to be in contact with both of the walls of the casing, a heating element supported between said double walls, a hollow member extending between a wall of the radiator-passage and said casing and serving as a water-excluding means of communication between an opening in said radiator wall and an opening in the outer wall of said casing and serving also to hold said casing at a distance from the wall of the said radiator passage, and means connected with the heating element and passing through said hollow member for energizing said heating element.

MORTIMER C. HOLLISTER.